Jan. 16, 1962     O. DITTRICH     3,016,755
LINK CHAIN FOR INFINITELY VARIABLE PULLEY GEAR TRANSMISSIONS
Filed Dec. 17, 1959
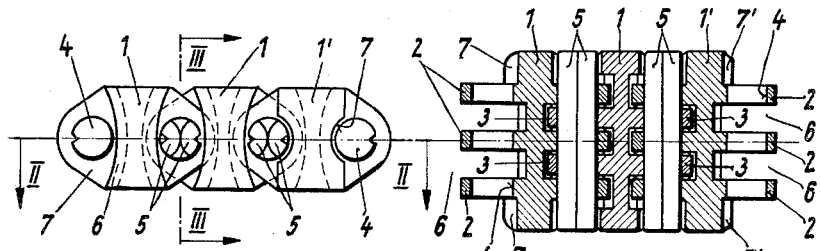
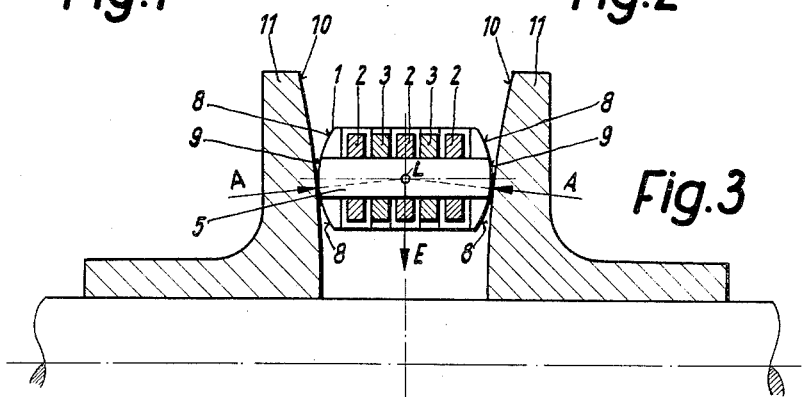
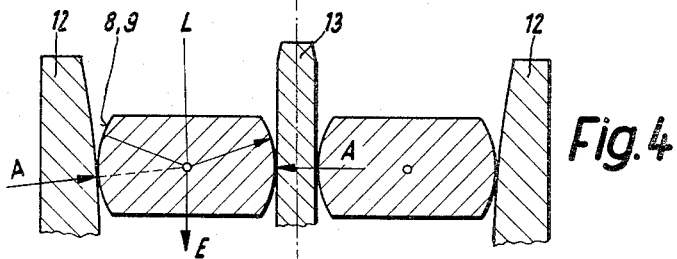
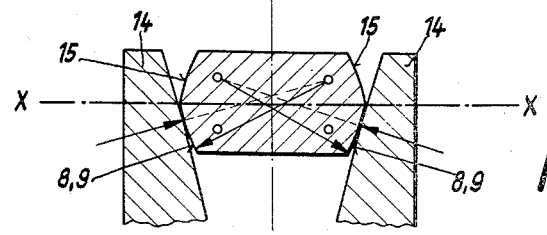
INVENTOR.
Otto Dittrich
BY
Barley Stephens & Huettig
ATTORNEYS United States Patent Office
3,016,755
Patented Jan. 16, 1962

3,016,755
LINK CHAIN FOR INFINITELY VARIABLE PULLEY GEAR TRANSMISSIONS
Otto Dittrich, Bad Homburg vor der Höhe, Germany, assignor to Reimers-Getriebe K.G., Ascona, Switzerland, a firm of Switzerland
Filed Dec. 17, 1959, Ser. No. 860,225
Claims priority, application Germany Dec. 20, 1958
5 Claims. (Cl. 74—230.17)

The present invention relates to a link chain for the frictional transmission of the driving force in infinitely variable pulley gears, in which the end surfaces of the link pins which pivotally connect the adjacent chain links to each other are employed for transmitting the driving force.

There are known link chains of this general type in which the link pins or the bushings surrounding the same are connected to each other by the side bars forming the strands of the chain. These known chains can, however, only be used in gears which may be subjected to a relatively small specific load since the only surface area of the chain which transmits the driving force by frictional engagement consists of the end surfaces of the link pins. The same applies to the known link chains in which the links between the joints are enclosed by framelike pressure plates.

There is, however, one known type of metal link chain which has proved successful in infinitely variable pulley gears which are subjected to greater specific loads. This chain consists of solid chain links which are provided with recesses in the opposite ends of each link to form intermediate bars or lugs for connecting the adjacent links to each other, and which also have elastic pressure rings rotatably mounted thereon. These rotatable pressure rings have the advantage that inasmuch as they will rotate during their engagement with the conical pulley disks, the unavoidable wear will be distributed over the entire surface of these pressure rings. Therefore, at least insofar as the wear upon them is concerned, the chains of this type of construction will remain serviceable for a very great length of time. However, since the pressure rings will be elastically deformed at every engagement with the pulley disks, the specific load to which a gear with such a chain or chains may be subjected cannot exceed a certain value.

It is an object of the present invention to provide a link chain for an infinitely variable pulley gear which is capable of withstanding extremely high specific loads upon the gear at least for limited periods of time.

A further object of the invention is to provide a link chain of the above-mentioned type which may be produced more easily and inexpensively than all other chains which were known for the same purpose prior to this invention.

The basic concept of the present invention is to design the link chain in such a manner that, similar to a V-belt, it will have a linear form of engagement substantially along its entire radius with the friction surfaces of the conical disks of each pair forming a pulley. In view of the high load to which the gear should be subjected, transmitting elements such as linkless belts, ropes, or the like are not worth any consideration since the curvature of the transmitting element within the pulley requires such a high elasticity of the respective material of this element, such as rubber, synthetic rubber, leather, plastics, or the like, that it cannot possibly sustain the stresses to which it has to be subjected in a direction transverse to its direction of movement by the high pressure against it by the conical disks of the pulleys and by the high tension within it in its direction of movement.

Thus, only a link chain may be considered which consists of a sufficiently hard and wear-resistant material, for example, a metal, particularly surface-hardened steel, or of synthetic materials with metal-like properties. The link chain according to the invention should specially also be applicable in those cases which occur rather frequently in actual practice in which a gear has to be subjected to an extremely high specific load, even though it may remain serviceable only for a limited period.

The above-mentioned objects may be attained according to the invention by a combination of the following principal features:

The link chain consists of individual links known as such in the form of solid bodies which are connected to the adjacent chain links by being provided with side bars or lugs which are formed by recesses in the opposite ends thereof. These links are designed so that the transverse bores in these lugs for receiving the link pins are spaced from each other at the smallest possible distance which is commensurate with the tensile strength, the compressive strength, and the torsional resistance which is required of the chain. Each link pin consists of a pair of rocking link pins which are also known as such. Furthermore, the outer surfaces of the chain links as well as the end surfaces of the link pins are provided with arcuate cylindrical surfaces which are disposed opposite to each other symmetrically to the longitudinal axis of the chain and positively engage with the surfaces of the conical friction disks of each pulley along a substantially unbroken line within the radius of the chain within the pulley. The radii of curvature of the arcuate cylindrical surfaces, which do not necessarily have to be circular cylindrical surfaces, may be smaller than one-half of the width of the chain, although it is more advisable to make them equal to or greater than one-half of the chain width.

The link chain according to the invention therefore consists of solid link bodies of the shortest possible length and thus has the smallest possible chain pitch. In view of the high tension to which the chain is subjected, the link pins are made in the form of rocking pins, that is, each pin consists of a pair of pins which are capable of rolling or rocking on each other. The chain is designed so that the solid link bodies as well as the end surfaces of the link pins which project practically without any intermediate gaps between the adjacent links will participate in the transmission of the driving force. Under the lateral pressure of the conical pulley disks, the substantially pointlike contact of the chain links and the end surfaces of the link pins with the conical pulley disks will change into an areal contact, and, because of the cylindrical cross section of the chain links, the contact surfaces will then extend along the length of the chain links and the end surfaces of the link pins, as seen in the direction of movement of the chain. As the load upon the gear increases, the length of the lines of contact will also increase until a contact surface will be produced which extends along the entire length of the chain links in the tangential direction thereof. This means that, when the chain is subjected to the maximum load, the link pins will fully cooperate with the links themselves in bearing this load. The extent of the contact surfaces in the radial direction of the conical pulley disks is, however, very small so that the positive engagement occurs substantially along an almost unbroken line in the peripheral direction of the disks. Although in this case, as compared with the known chains with rotatable pressure rollers, a greater lateral pressure has to be exerted upon the chain in order to prevent the chain from slipping and to reduce the wear to a minimum, such a chain may be used for operating a gear which is subjected to a much higher specific load. Due to the unavoidable wear upon the contact surfaces, the life of a chain according to the invention is shorter than that of a chain with rotatable pressure rollers.

Although in industrial plants in which infinitely variable speed transmissions do not have to be limited in size, such transmissions should generally be able to run without breakdown for several hundred thousand hours, there are certain cases in which it is more important that the gear will be capable of operating under a very high specific load than that it will remain serviceable for a long time.

It has been found advisable to make the recesses which are required in each chain link at both sides of the two outer connecting lugs for assembling and installing the chain of such a size that only such a small gap will remain between the outer surfaces of the rocking link pins and the bottom surfaces of the recesses as is necessary to install the pins. The chain according to the invention will then have the greatest possible length of engagement with the conical pulley disks which is attainable within the radius of the chain within the pulley, namely, one of almost 100%. The small chain pitch, and the almost uninterrupted line of contact between the chain and the friction disks also result in an operation of such low noise as has hitherto never been attained with any of the known chains. Furthermore, the almost uninterrupted contact length also produces the advantage that the creeping movement of the chain relative to the friction disks which cannot be fully avoided in any frictional transmission of a driving force, does not result in any hydrodynamic oil wedging as it occurs in the known chains in which the individual lines of contact with the surfaces of the friction disks are interrupted by gaps of at least a similar size where no contact occurs.

In order to eliminate any torsional moment about the longitudinal axis of the chain which is very detrimental to the effective operation and life of the chain and leads to tilting or skewing thereof, as well as to increased stresses upon the bearing surfaces of the link pins and thus to premature wear of the latter and of the walls of the bores in the chain lugs, and which thus, in turn, leads to still greater torsional moments, the invention further provides that the diameter of the curvature of the arcuate surface which is coordinated with the line of contact of the arcuate cylindrical surfaces of the link pins and chain links with the surfaces of the pulley disks is disposed so as to intersect with the longitudinal axis of the chain.

The arcuate surfaces are preferably made in the form of circular cylindrical surfaces with a cylinder axis which coincides with the longitudinal axis of the chain. In this event, there will be no torsional moments about the longitudinal axis of the chain even though the chain has to run in an unsymmetrical pulley groove, that is, in one in which the flanks for the opposite friction disks have different slopes, for example, when two parallel chains are applied to transmit the driving force and are pressed by conical friction disks against a common central friction disk with parallel faces. If the chain according to the invention is to be used in a pulley gear with a symmetrical conical grove between the disks of each pulley, it has been found to be of great advantage if each chain link and each link pin thereon has four arcuate, and preferably circular cylindrical surfaces, which are arranged in pairs and wherein the surfaces of at least one pair are symmetrical relative to the longitudinal axis of the chain. The radii of curvature of each pair of these surfaces which are coordinated with the lines of contact with the surfaces of the pulley disks are disposed so as to intersect each other within the central plane of the chain and they are of a length substantially equal to or greater than one-half of the width of the chain.

These and other objects, features and advantages of the present invention will become further apparent from the following detailed description, particularly when the same is read with reference to the accompanying drawings, in which—

FIGURE 1 shows a side view of one embodiment of the link chain according to the invention;

FIGURE 2 shows a cross section taken along line II—II of FIGURE 1;

FIGURE 3 shows a cross section taken along line III—III of FIG. 1 and also illustrates a pair of conical pulley disks of an infinitely variable pulley gear;

FIGURE 4 shows a partial cross section also taken along line III—III of FIGURE 1, of a part of a pulley gear with two parallel chains, but without showing any details of the construction of the chain; while FIGURE 5 shows a partial cross section also taken along line III—III of FIGURE 1, of a part of a pulley gear with a pulley with a symmetrical conical groove and a chain according to a modification of the invention.

Referring to the drawings, the chain according to the invention consists of a plurality of solid chain links 1 and 1', as illustrated particularly in FIGURES 1 and 2, which are produced by recesses which are cut into each solid link body at both ends thereof to form chain lugs 2 and 3, respectively, as well as the recesses 6 for receiving the lugs of the adjacent chain link. In the particular embodiment shown in FIGURES 1 and 2, the adjacent chain links have alternately either three chain lugs 2 or two chain lugs 3 which interengage with each other when the chain is assembled. Chain lugs 2 or 3 of each link have transverse bores 4 for receiving a pair of rocking link pins 5 which connect the adjacent chain links pivotably to each other. The recesses 6 between lugs 2 or 3 are cut deeper than the recesses 7 at the outer sides of each outer lug. These outer recesses on the left chain link as shown in FIGURE 1 are milled with a cutter of a diameter which is considerably greater than that of bore 4, while on the right chain link these outer recesses 7' are milled with a cutter of a diameter which is only slightly greater than that of bore 4.

FIGURE 2 shows that the distance between the bores of each link for receiving the rocking link pins 5 is made as small as possible. The individual links of the chain are therefore as short as the required solidity thereof will possibly permit.

FIGURE 3 illustrates that the outer surfaces 8 of the links and the end surfaces 9 of the rocking link pins 5 together form oppositely curved cylindrical surfaces which are disposed symmetrically to the longitudinal axis L of the chain, that is, the axis indicated by the dot-and-dash line in FIGS. 1 and 2, extending transversely of the drawing in the plane thereof. These surfaces do not, however, necessarily have to be circular cylindrical surfaces. These arcuate surfaces produce a linear engagement of the chain with the inner surfaces 10 of the pair of conical friction disks 11 which form one pulley of the gear, and this linear engagement extends substantially along the entire length of the loop of the chain between the friction disks.

This is attained by cutting the outer recesses 7 at both sides of the outer chain lugs 2 or 3 only so deep that between the outer surfaces of the rocking link pins 5 and the bottom surfaces of these recesses there will only be sufficient room to permit these pins to be inserted. Due to the inclination of the inner surfaces 10 of the pulley relative to a plane extending vertically to the axis of rotation, the line of engagement will be disposed slightly below the center of the chain links. Recess 7' should therefore be designed in the manner as shown on the right link in FIGURE 1 in order to attain a line of engagement of the outer surfaces 8 of the chain links and the end surfaces 9 of the link pins with the inner surfaces 10 of pulley disks 11 which is as little interrupted as possible.

The compact size of the solid chain links 1 and 1' permits the diameter of the curvature of the curved surface which is coordinated with the line of engagement of the curved cylindrical surfaces 8 and 9 of chain links 1 and link pins 5 with the friction surface 10 of the pulley, to intersect with the central longitudinal axis of the chain which is indicated in FIGURE 3 by the letter L. The direction of the pressure A which is applied upon the chain therefore also intersects with the longitudinal axis L of the chain through which also the wedging force E extends which is directed radially toward the inside, as well as the traction of the chain which extends vertically to the plane of the drawing. Since all of these forces intersect at one point, no torsional moments can occur, and especially no torsional moments about the longitudinal axis L of the chain which might cause a tilting or skewing of the chain between the two conical disks of the pulley which would lead to a premature wear and destruction of the chain. The curved surfaces 8 and 9 of the chain are preferably made circular cylindrical with the center of curvature coinciding with the longitudinal axis of the chain. The same kind of curvature is also applied to the cylindrical surfaces 8 and 9 of the embodiment according to FIGURE 4 which illustrates that a chain of such a cross-sectional shape is also suitable for being used in an unsymmetrical conical pulley groove which is formed by a conical disk 12 and a central bracing disk 13 with parallel faces. The pressures A which are exerted upon each chain from the opposite sides thereof extend also in this case in directions which intersect with the longitudinal axis L of the chain which is also the center of the wedging force E and of the traction of the chain which extends vertically to the plane of the drawing.

FIGURE 5 illustrates another chain with a cross-sectional shape according to a modification of the invention which is to be used for a conical pulley with a symmetrical conical groove as shown in FIGURE 3 which is formed by the two conical disks 14. The curved cylindrical surfaces 8 and 9 of each chain link and its link pin are in this case shaped in the form of two circular cylindrical surfaces, each of which has a different center of curvature M. Each pair of these centers is disposed symmetrically to the other pair and to the central plane of the chain; each center M is located at the other side of the longitudinal axis L of the chain as seen from the respective curved surface; and all of the radii of the curved surfaces intersect with the longitudinal axis L of the chain or at least pass very closely adjacent thereto. Due to the symmetrical shape of the chain relative to the transverse axis X—X, two further pairs of cylindrical surfaces 15 are formed which permit the chain to be turned over after the curved pair of surfaces 8, 9 of the links has been worn beyond a certain limit. When the chain is thus mounted in an inverse position to its previous application, the curved surfaces 15 will be in frictional engagement with the conical surfaces of the pulley disks 14.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A link chain for an infinitely variable pulley-gear transmission, in which at least one pulley for transmitting the driving force within said gear consists of a pair of friction disks at least one of which is tapered, and in which means are provided for pressing one of said disks toward the other disk and against the chain interposed between and looped around said disks, said chain comprising a plurality of solid link bodies having recesses in their ends so as to form connecting lugs adapted to interengage with the lugs of the adjacent links, said lugs having transverse bores, and a link pin inserted into the lugs of each link for pivotably connecting said adjacent links to each other, each of said link pins comprising a pair of rocking pins adapted to engage with and rock on each other, said bores in the lugs at one end of each link being spaced from the bores in the lugs at the other end at the minimum distance commensurate with the required tensile strength, compressive strength and torsional resistance of said links, the outer surfaces of each link and the end surfaces of each link pin having opposite arcuate cylindrical surfaces disposed symmetrically to the longitudinal axis of said chain and adapted positively to engage at each side with the surface of one of said friction disks of said pair along a substantially uninterrupted line of the loop formed by said chain within said pulley.

2. A link chain as defined in claim 1, in which the recesses in each link at both sides of the two outer connecting lugs are of a size so that, when one of said link pins is inserted into said bores in said connecting lugs, a gap remains between the outer surfaces of said pin and the bottom surface of each of said recesses, said gap having a width so small as merely to allow the insertion of said pins.

3. A link chain as defined in claim 1, in which the diameter of the curvature of each of said arcuate cylindrical surfaces of said link pins and chain links which is coordinated with said substantially uninterrupted line of engagement of said arcuate surfaces with the surfaces of said friction disks substantially intersects with the longitudinal axis of said chain.

4. A link chain as defined in claim 3, in which said arcuate surfaces of said links and link pins form circular cylindrical surfaces having a cylinder axis substantially coinciding with the longitudinal axis of said chain.

5. A link chain as defined in claim 3, in which each link and each link pin have four cylindrical surfaces arranged in pairs, the surfaces of at least one pair being curved symmetrically to the longitudinal axis of said chain, the radii of curvature of said surfaces which are coordinated with the lines of engagement with the surfaces of said friction disks extending inversely symmetrically to the vertical and horizontal central planes of said chain.

References Cited in the file of this patent

UNITED STATES PATENTS

| 1,731,827 | Reeves | Oct. 15, 1929 |
| 2,803,144 | Gesche et al. | Aug. 20, 1957 |

FOREIGN PATENTS

| 712,876 | France | Oct. 14, 1931 |